(12) United States Patent
Lee

(10) Patent No.: US 10,096,266 B2
(45) Date of Patent: Oct. 9, 2018

(54) DENTAL TRAINING DEVICE

(71) Applicant: Charles Q Lee, Leawood, KS (US)

(72) Inventor: Charles Q Lee, Leawood, KS (US)

( * ) Notice: Subject to any disclaimer, the term of this patent is extended or adjusted under 35 U.S.C. 154(b) by 391 days.

(21) Appl. No.: 14/734,245

(22) Filed: Jun. 9, 2015

(65) Prior Publication Data

US 2016/0365008 A1    Dec. 15, 2016

(51) Int. Cl.
*G09B 23/30* (2006.01)
*G09B 23/28* (2006.01)
*G09B 23/00* (2006.01)

(52) U.S. Cl.
CPC ............ *G09B 23/283* (2013.01); *G09B 23/00* (2013.01); *G09B 23/286* (2013.01); *G09B 23/30* (2013.01)

(58) Field of Classification Search
None
See application file for complete search history.

(56) References Cited

U.S. PATENT DOCUMENTS

| | | | |
|---|---|---|---|
| 1,205,437 A * | 11/1916 | Delabarre | G09B 23/283 434/264 |
| 2,750,670 A | 6/1956 | Vigg | |
| 3,458,936 A * | 8/1969 | Tuccillo | A61C 9/002 434/263 |
| 3,947,967 A | 4/1976 | Satake | |
| 4,137,633 A | 2/1979 | Kahn | |
| 5,232,370 A * | 8/1993 | Hoye | G09B 23/283 434/263 |
| 6,520,775 B2 | 2/2003 | Lee | |
| 6,988,894 B2 | 1/2006 | Lee et al. | |
| 7,713,063 B2 | 5/2010 | Lee et al. | |
| 8,235,727 B2 | 8/2012 | Lee et al. | |
| 8,277,224 B2 | 10/2012 | Lee et al. | |
| 8,465,291 B2 | 6/2013 | Bell | |
| 2007/0037130 A1* | 2/2007 | Lee | G09B 23/28 434/263 |

\* cited by examiner

*Primary Examiner* — James Hull
(74) *Attorney, Agent, or Firm* — Erickson Kernell IP, LLC; John C. McMahon

(57) ABSTRACT

A manikin assists a student in learning to perform root canal therapy on a primary tooth of a child without damaging the underlying adult tooth bud. The manikin includes one or more inserts including a model of an upper primary tooth with roots and a lower adult tooth bud. The manikin includes a jaw portion that is receivable into a hinged dental training aid, so as to simulate the mandible or maxilla of the child. The jaw includes bony portions with a plurality of insert-receiving sockets. The bony portions are covered by an elastic simulated gum tissue that engages the primary tooth of an installed insert.

15 Claims, 4 Drawing Sheets

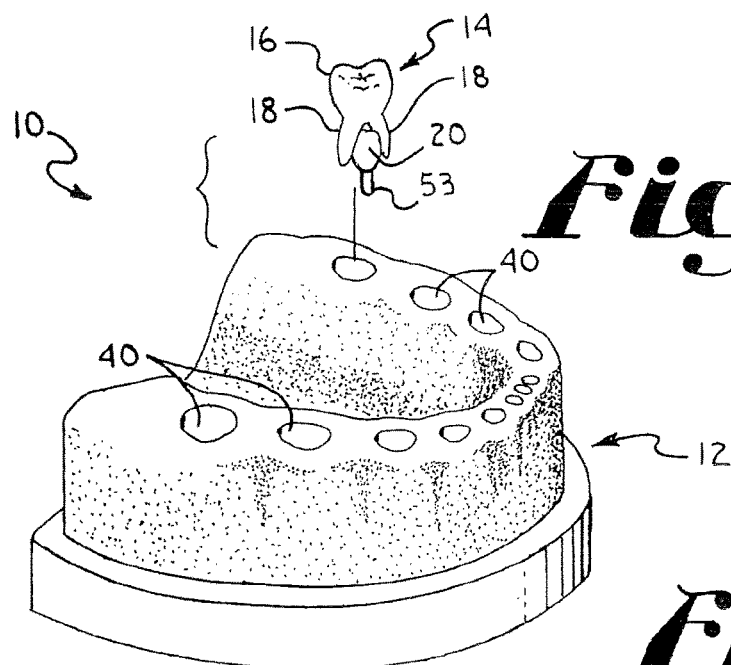
Fig. 1.
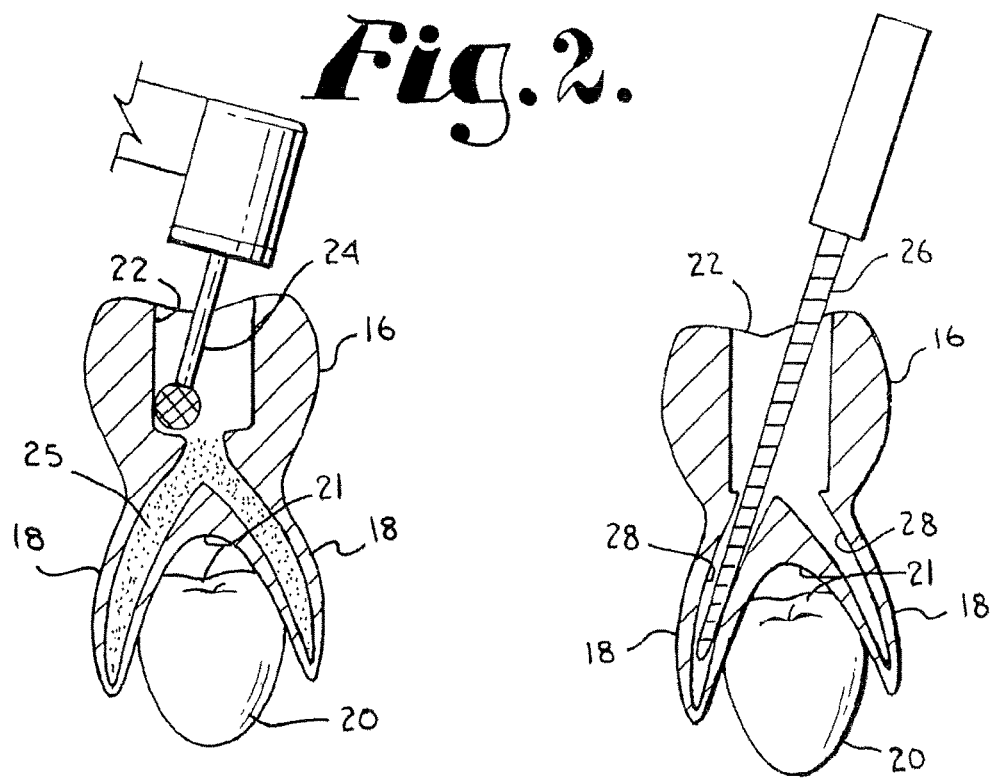
Fig. 3.
Fig. 2.

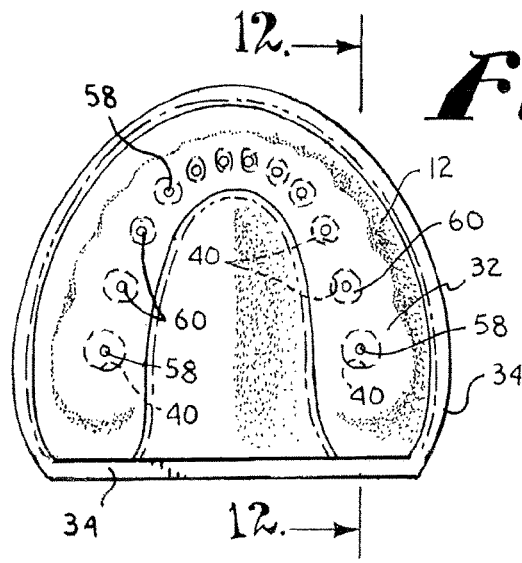
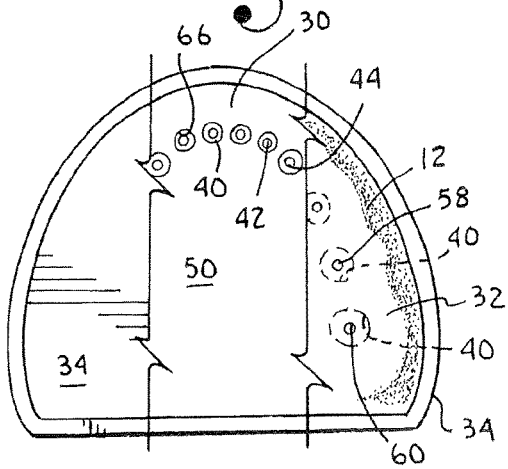
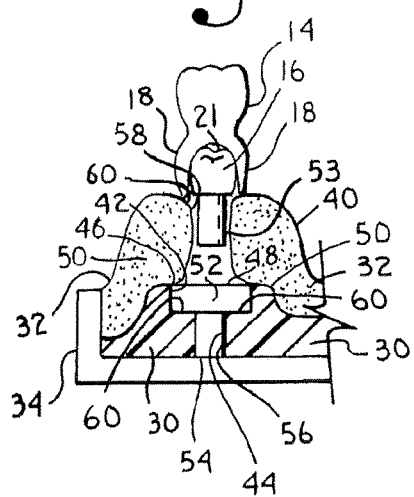
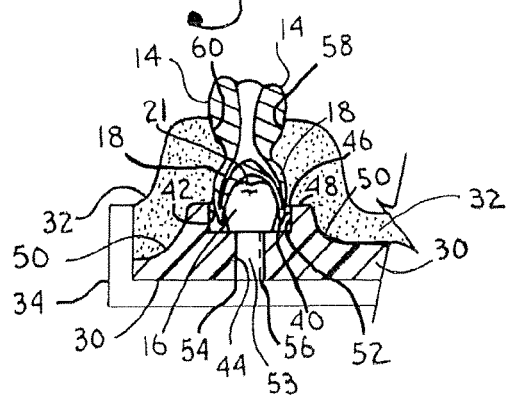

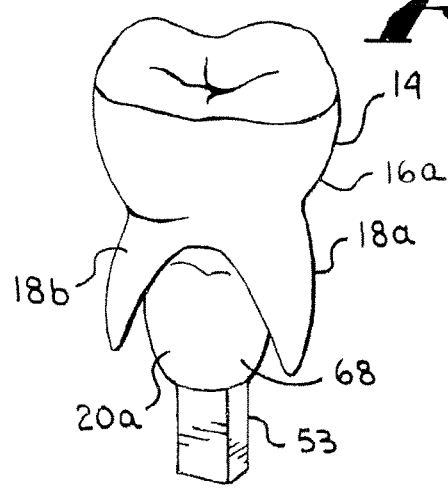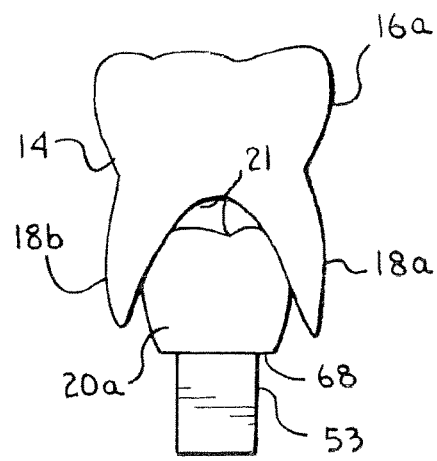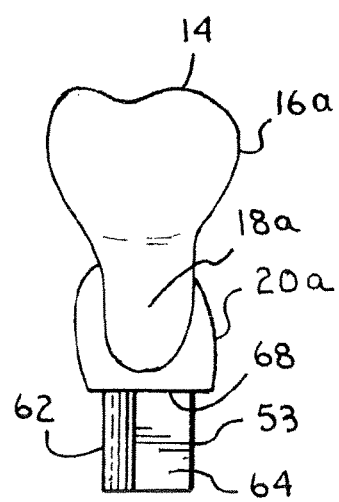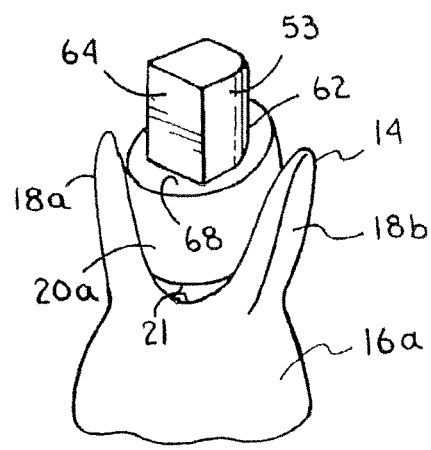

DENTAL TRAINING DEVICE

BACKGROUND OF THE INVENTION

The present invention is related to dental equipment and methods of teaching performing root canals on the primary teeth of young children.

Prior to eruption, permanent (also referred to as adult succedaneums) teeth are located below the primary teeth, also referred to as deciduous, milk, baby, or temporary teeth. Although preventive measures have reduced dental caries, premature loss of pulpally involved tissue in primary teeth remains a common problem. Premature loss of primary teeth may result in mesial drift of the permanent teeth, which frequently leads to malocclusion. Retention of the pulpally involved primary tooth to preserve arch space is preferable to space maintenance if the tooth can be restored to normal function and is free of pathology.

Persons training to become dentists must learn how to properly remove diseased pulp and perform the other necessary procedures.

Dental students can use training devices or fixtures, such as manikins, with real or artificial teeth, that simulate an adult patient, for at least some of the student endodontic procedures. For example, U.S. Pat. Nos. 6,520,775, 6,988,894 and 7,713,063, which are incorporated herein by reference, disclose dental training aids and methods which assist a student in learning how to determine the position of an adult root canal apex, repair of adult dental decay, and how to perform crown and bridge procedures. Modular inserts are utilized that include structure thereon for performing root canal procedures, repair of dental decay procedures, crown and bridge procedures or other procedures. The inserts can be assembled and configured to provide practice on a particular procedure or on a variety of procedures and can be exchanged for other inserts once they are no longer reusable or because the user needs to train on a different procedure.

In young children, the buds of the adult teeth are located below the roots of the primary teeth. Due to their differences in anatomy, primary teeth present special problems not observed in adult teeth. Primary teeth are smaller in all dimensions than the corresponding permanent teeth. The thickness of enamel and coronal dentin to the pulp chamber is also thinner in a primary tooth. The distance from the occlusal surface to the floor of the pulp chamber is much shorter than in the permanent tooth. Primary molar roots are widely divergent and curved to allow for the development of the succedaneous tooth. Because of this, care must be taken when making an access opening into the pulp chamber to prevent perforation through the floor into the furcation area. During instrumentation the curvature of the roots increases the chance of perforation of the apical portion of the root or the coronal one-third of the canal into the furcation. Placement of root canal instruments and filling materials beyond the radiographic apex must be avoided to prevent possible damage to the permanent tooth bud, just beneath the primary tooth.

Therefore, there is a need for a training device that simulates a child's mouth and teeth for learning and practicing dental procedures on primary teeth while avoiding damage to the tooth buds located below the primary teeth.

SUMMARY OF THE INVENTION

The present invention provides an improved device and method for the training of root canal therapy procedures on a tooth of a young child without damaging the underlying adult tooth bud, which may abut or engage the root of the associated primary tooth. The invention uses a replica mandible or maxilla that includes a jaw portion with at least one socket for receiving a replica primary tooth structure. The jaw portion is contoured so as to simulate the child's jaw and includes a bony portion and overlying simulated gum tissue. At least one replicated primary tooth structure is provided and includes the primary tooth with an attached root and a tooth bud that contacts the root, and a downwardly extending stem that engages the socket to securely fix the insert into the jaw portion. When installed into the jaw portion, the primary tooth structure mimics the small and delicate nature of primary teeth and the close proximity of the tooth bud to the primary tooth's root, so as to enable a dental student to learn and practice root canal procedures on such a child while not damaging the child's tooth bud.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a dental manikin of the present invention, including a jaw portion with a tooth insert.

FIG. 2 is a greatly enlarged cross-sectional illustrating a first step in performing a root canal procedure on a model of a young child's primary molar.

FIG. 3 is a view similar to FIG. 1 and illustrates a second step in performing a root canal on a model of a primary molar.

FIG. 6 is a top plan view of the jaw portion of the dental manikin of FIG. 1.

FIG. 7 is a view of the jaw portion of FIG. 6 with portions broken away.

FIG. 8 is an enlarged perspective view of the tooth insert of the dental manikin of FIG. 1, wherein the tooth insert includes a primary molar with two roots and a tooth bud located below the roots.

FIG. 9 is a front elevational view of the tooth insert of FIG. 8.

FIG. 10 is a side elevational view of the tooth insert of FIG. 8.

FIG. 11 is a perspective view of the tooth insert of FIG. 8 with the tooth insert inverted and showing details of the bottom of the insert.

FIG. 12 is an enlarged cross-sectional view of the manikin of FIG. 1, taken along line 12-12 of FIG. 6 and with portions broken away, and illustrating a first step in inserting the tooth insert into the jaw portion.

FIG. 13 is a view similar to FIG. 12 with portions broken away illustrating second step in inserting the tooth insert the jaw portion.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In FIG. 1, the number 10 generally denotes a dental manikin of the present invention, for use by dental students in learning dental procedures on young children. The manikin 10 can be installed into a dental training aid or fixture 11 (see FIG. 4), so as to simulate the mouth of a young child. Such training aids 11 are known in the art, such as the training aids described in U.S. Pat. Nos. 6,988,894 and 7,713,063, referred to above. The manikin 10 is an anatomical model, and references below to anatomical components of the manikin 10 should be interpreted as references to models of such anatomical components, unless otherwise specified.

Figure 5:
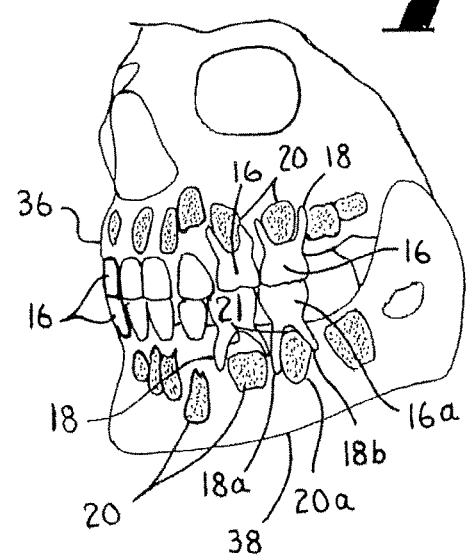
FIG. 5 is a fragmentary perspective view of a model of the skull of a child 2-5 years of age, showing the locations of some of the child's primary teeth and the corresponding adult tooth buds.

The manikin 10 includes a jaw portion, generally 12, and a tooth insert, generally 14, that is receivable into the jaw portion 12 as described below in greater detail. The manikin 10 is particularly useful in teaching dental students how to perform a root canal therapy procedure, or a "root canal," on a young child, such as a child of about 2-5-years of age. As shown in FIG. 5, in children of this age, the primary teeth 16 (i.e., the baby teeth) have roots 18 that are adjacent to or contact the buds 20 of the corresponding adult teeth (shown as shaded teeth in FIG. 5). For example, in FIG. 5, the adult tooth bud denoted by 20a is located below the corresponding baby tooth 16a, and contacts the two roots 18a and 18b of that baby tooth 16a.

Generally, when performing a root canal, as represented by procedures performed on the tooth insert models 14 shown in FIGS. 2 and 3, a small access opening hole 22 is drilled through the biting surface (i.e., the top) of an affected tooth 16 (i.e., the enamel and the dentin) with a dental drill 24 (FIG. 2). The access hole 22 provides access to the interior of the tooth's roots 18, below. Then, material representing diseased and dead pulp tissue 25 within the tooth 16 and the root 18 is removed using an endodontic drill or file 26 or similar instruments known in the art (FIG. 3). Eventually, as is known in the art, the prepared root canal 28 is disinfected, shaped and then filled with a suitable filling material known in the art. Although FIGS. 2 and 3 illustrate the insert 14 as having hollow roots 18 with material 25 representing pulp tissue to be removed, it is foreseen that the inserts 14 could be formed solid of a single material without the material 25 within the canals 28.

It is known that primary teeth 16 are generally smaller and have thinner enamel than is generally found in adult teeth (not shown). Because of this more delicate nature of primary teeth 16 and the location of the adult tooth buds 20 below and in contact with the roots 18 of the primary teeth 16 (see FIG. 5), it is difficult to perform a root canal on a young child without breaking through the root 18 and damaging the bud 20. Damaging the buds 20 can lead to improper growth and improper development of permanent tooth, which may to common developmental problems such as persistent deciduous teeth, unerupted teeth, malformed teeth, malocclusion, and malformed jaws.

As shown in FIGS. 6-7 and 12-13, the illustrated manikin 10 includes a jaw portion or component 12 that simulates either an upper or a lower jaw of the young child. The jaw portion 12 includes a bony portion or base 30, a gum portion or component 32 covering the bony portion 30 and a tray 34 that receives the bony portion 30. The bony portion 30 may be molded of a material such as a hard resin, as is known in the art, and shaped so as to simulate either a maxilla 36 or a mandible 38 (see FIG. 5). The jaw portion 12 is shaped and sized to receive a plurality of inserts 14, which are described in greater detail below. For example, in some embodiments, the jaw portion 12 is configured, arranged and structured so as to receive at least ten inserts 14. It is foreseen that the jaw portion 12 may be configured, arranged and structured to receive a lesser or greater number of inserts 14. It also is foreseen that the jaw portion 12 may be configured, arranged and structured to receive a combination of primary teeth 16 and adult teeth.

To receive and support the inserts 14, the bony portion 30 includes a plurality of insert-receiving channels or sockets 40. Each socket 40 is sized and shaped to receive at least one inert 14. In some embodiments, the sockets 40 are sized and shaped to receive a variety of inserts 14 of differing sizes.

As is most easily seen in FIGS. 12 and 13, the sockets 40 include an upper portion 42 joined with a lower portion 44. The socket upper portion 42 includes an upper opening 46 that is defined by an upper edge 48. The socket upper opening 46 joins the upper portion 42 with the outer surface 50 of the bony portion 30. The upper portion 42 and the upper opening 46 are sized and shaped to receive a tooth insert 14 therein. The inner surface 52 of the upper portion 42 is sized and shaped so as to receive inserts 14 of various sizes while not contacting or engaging the insert roots 18. The socket lower portion 44 is sized and shaped to receive and engage a tooth insert mounting element, such as a shaft or stem 53 (see FIGS. 8-11) of the tooth insert 14 so as to hold and secure the insert 14 in place, such as described in greater detail below. The socket lower portion 44 includes a lower opening 54 that is defined by a lower edge 56. The lower opening 54 provides access to the bottom end of the insert 14 after the insert has been installed into the jaw portion 12. For example, the stem 53 can be secured to the jaw bony portion 30 by a fastener (not shown), such as a screw, a pin, or the like that extends through the lower opening 54, such as is known in the art.

As shown in FIGS. 1, 6-7 and 12-13, the gum portion 32 covers the bony portion 30 of the jaw portion 12. The gum portion 32 may be formed of a pliable, flexible elastomeric material, such as a polymer known in the art, and is shaped so as to simulate the skin and gum tissue of a human jaw, so as to provide the student with a more realistic learning experience. The gum portion 32 can be molded directly on to or alternatively formed and then attached to the bony portion 30.

The gum portion 32 includes an insert-receiving opening 58 that is defined by an elastic tissue edge 60. The openings 58 are aligned with the corresponding socket upper portions 42 so that the tooth insert 14 is insertable through the gum opening 58 and received into the associated socket 40. For example, as shown in FIGS. 12 and 13, the gum portion 32 covers the bony portion 30, and the gum portion opening 58 is aligned over the associated upper opening 46. The gum opening 58 is smaller in diameter than the socket upper opening 46. Since the gum portion 32 is flexible, the tissue edge 60 can be pulled back and stretched around the insert 14 as the insert 14 is passed through the gum opening 58 and into the socket 40. When the insert 14 is fully received in the socket 40, the tissue edge 60 relaxes and contacts the primary tooth 16, so as to simulate the contact between gum tissue and a tooth, such as is found in a human mouth.

Referring now to FIGS. 1, 8-13, the tooth insert 14 includes a primary tooth 16 and a corresponding adult tooth bud 20 that may be fabricated, as by three dimensional or 3D printing, using known polymer inks for 3D printers. As is known in the art, 3D printing (or additive manufacturing, AM) is any of various processes used to make a three-dimensional object. In 3D printing, additive processes are used, in which successive layers of material are laid down under computer control. These objects can be of almost any shape or geometry, and are produced from a 3D model or other electronic data source. It is also foreseen that the tooth insert 14 may be formed by other processes, such as by molding, casting, or the like. The primary tooth 16, of the insert 14, can be a primary incisor, canine or molar with a corresponding roots 18 and tooth bud 20. For example, as is known in the art, a primary incisor is replaced by an adult incisor; so a primary incisor tooth insert 14 includes an adult incisor tooth bud 20 below the primary incisor root 18 (see FIG. 5).

It is known that the primary molars are replaced by adult premolars, or bicusbids (see FIG. 5). Accordingly, a primary molar insert 14 includes a primary molar 16a with two roots 18a and 18b, and a premolar tooth bud 20a nestled between the roots 18a and 18b (see FIGS. 1, 8-13). Generally, the roots 18a and 18b are slightly spaced from the premolar tooth bud 20a.

It is known that at different stages of a child's development, the size of the tooth bud 20a varies, with a corresponding change in the amount of spacing 21 (see FIGS. 5, 9, 11-12) between the tooth bud 20a and the adjacent roots 18a and 18b. For example, when a child is very young, the tooth bud 20a is very small and therefore the spaced farther from the roots 18a, 18b (i.e., the space 21 is larger) that when the child is older (i.e., the space 21 is smaller). As the child grows and develops the size of the tooth bud 20a increases, which causes a corresponding decrease in the amount of space 21 between the tooth bud 20a and the roots 18a, 18b. Accordingly, in some embodiments, the tooth insert 14 is constructed so as to represent children of various ages. For example, the manikin 10 includes 2, 3, 4, 5 or more tooth inserts 14, with progressively larger tooth buds 20a and a corresponding progressive reduction in the spacing 21 between the tooth buds 20a and the associated roots 18a, 18b. Providing a series of tooth inserts 14, wherein the tooth inserts 214 represent children of progressively older ages, provides the dental student opportunities to practice dental procedures when the spaces 21 between the tooth buds 20a and the roots 18a, 18b are different sizes.

The tooth bud 20a includes a stem 53. The stem 53 may be cylindrical or have a square or rectangular cross-section. Alternatively, the stem 53 may include a cross-section that includes a curved portion 62 and a straight portion 64, such as is shown in FIGS. 10-11. The socket lower portion 44 is sized and shaped to be complementary to and mate with the stem 53. When engaged, the stem 53 and lower portion 44 firmly hold the tooth insert 14 in place even though the insert roots 18a and 18b may not contact or engage the inner surface 52 of the socket upper portion 42.

FIGS. 12 and 13 illustrate inserting the tooth insert 14 of the present invention into the socket of the jaw 12. As shown in FIG. 12, the insert 14 is vertically aligned with the gum opening 58 and the socket 40. In some embodiments, the gum opening 58 may include a diameter greater than the diameter of the insert stem 53, so that the stem 53 can be inserted through the gum opening 58. However, the diameter of the gum opening 58 is normally less than the diameter or width of the roots 18 and the primary molar 16. To pass the roots 18 and the tooth 16 through the opening 58, the opening edge 58 is pulled outwardly, as by use of a tool (not shown) away from the socket edge 48, so as to enlarge the opening 58 sufficiently for the roots 18 and the tooth 16 to pass therethrough. When the gum opening 58 is sufficiently enlarged, the insert 14 is pushed downwardly into the jaw 12, until the insert stem 53 engages and mates with the socket lower portion 44, such as is shown in FIG. 13. It is foreseen that the socket 40 may include a shoulder 66 (see FIG. 12) or other structure that engages a lower surface 68 (FIGS. 9-11, 13) of the insert 14. In some embodiments, the lower surface 68 is a surface of the tooth bud 20, such as an annular surface that mates with the shoulder 66. In other embodiments, the surface 68 may be a side surface 68 (see FIG. 8) of the bud 20. It is foreseen that the roots 18 may also engage the socket shoulder 66.

When the insert 12 is fully engaged in the socket 40, the gum tissue edge 60 relaxes so as to contact or engage the primary tooth 16 (see FIG. 13). In some embodiments, the stem 53 may engage the tray 34 through the socket lower opening 54. It is foreseen that the stem 53 may be fixed to the jaw bony portion 30 by a fastener (not shown) or other means known in the art.

The insert 12 is removable from the jaw 12 by grasping the primary tooth 16, using fingers or a tool, and pulling upwardly until the insert 12 is separated from the jaw 12. The manikin 10 may be provided with additional inserts 12, so that the inserts 12 can be used and then replaced, so that the dental student can practice the root canal procedure multiple times. It is foreseen that the inserts 12 may be of differing sizes, such as to provide the student with varying experiences during practicing the root canal procedure, since the teeth of each child will be different. Additionally, the student may begin learning the root canal procedure with a larger insert 14, and then replace the large insert 14 with a series of progressively smaller inserts 14, so as to "work up" to practicing the procedure on the smallest, and therefore most difficult, tooth inserts 14.

Figure 4:
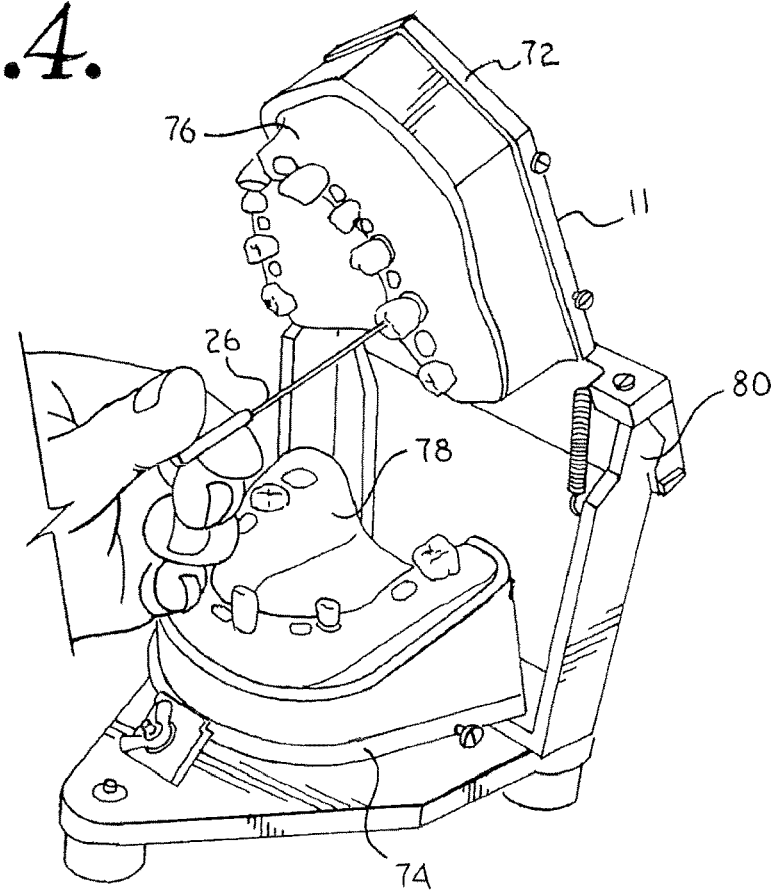
FIG. 4 is a perspective view of a training aid for use by dental students, wherein the dental manikin of FIG. 1 is the training aid.

Referring now to FIG. 4, the manikin 10 of the present invention is sized and shaped to be engaged into a dental training aid, such as the articulated dental training aid or fixture 11 shown in FIG. 4, so as to simulate the jaw and teeth of a young child. Similar types of training aids 11 are described in the previously referenced U.S. Pat. Nos. 6,988,894 and 7,713,063. Such training aides 11 generally include a stand with an upper mount 72 and a lower mount 74. The upper mount 72 removably receives an upper manikin 76 that simulates the maxilla of a child. Similarly, the lower mount 74 removably receives a lower manikin 78 that simulates the mandible of a child. The illustrated upper and lower mounts 72, 74 are pivotally joined at a hinge 80 that enable the dental student to open and close the dental aid 11 to mimic opening and closing a mouth. Maxilla and mandible versions of the manikin 10 of the present invention may be removably engageable with the respective upper and lower mounts 72, 74 so as to simulate a child's mouth. The associated tooth inserts 14 are removably engageable in the sockets 40, so that the inserts 14 can be replaced without removing the manikin 10 from the training aid 11.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention. It is to be understood that while certain forms of the present invention have been illustrated and described herein, it is not to be limited to the specific forms or arrangement of parts described and shown.

All references cited herein, including but not limited to published and unpublished applications, patents and literature references are incorporated herein by reference in their entirety and are hereby made a part of this specification.

What is claimed and desired to be secured by Letters Patent is as follows:

1. A dental insert for a dental training device, the training device having a jawbone socket, the insert comprising:
   (a) a model of a primary tooth with a root;
   (b) a model of a bud of an adult tooth engaged with the primary tooth; and
   (c) an insert stem secured to the bud and adapted for mounting of the insert in the jawbone socket; the stem being positioned to allow a simulated root canal procedure to be performed on the root of the primary tooth without interference from the stem.

2. An insert as set forth in claim 1 wherein:
   (a) the primary tooth is a model of a primary molar with at least two roots.

3. An insert as set forth in claim 1 wherein:
   (a) the insert stem extends from the bud in a direction away from the primary tooth and is integral with the bud.

4. An insert as set forth in claim 1 wherein the primary tooth is formed of a first material and wherein:
   (a) the root of the primary tooth has surfaces forming a canal within the root; and
   (b) the canal is filled with a second material different from the first material and representing a pulp material to be removed from the canal by a dental training procedure.

5. An insert as set forth in claim 1 in combination with a model of a human jaw, the jaw including:
   (a) a model of a jawbone;
   (b) the jawbone including a socket configured to removably receive the insert; and
   (c) gum material representing gum tissue which is positioned in covering relation to the jawbone.

6. A dental training device comprising:
   (a) a model of a human jaw, the jaw including:
      (1) a model of a jawbone;
      (2) the jawbone including a socket configured to removably receive a dental insert; and
      (3) gum material representing gum tissue which is positioned in covering relation to the jawbone; and
   (b) a dental insert including:
      (1) a model of a primary tooth with a root;
      (2) a model of a bud of an adult tooth fixedly engaged with the root; and
      (3) an insert stem operably mounting the insert in the jawbone socket, the insert stem being part of the bud and extending outwardly from the bud and away from the root so as to not interfere with a root canal procedure performed on the primary tooth.

7. An insert as set forth in claim 6 wherein:
   (a) the primary tooth is a model of a primary molar with at least two roots; and
   (b) the bud is engaged with each root.

8. An insert as set forth in claim 6 wherein the primary tooth is formed of a first material and wherein:
   (a) the root of the primary tooth has surfaces forming a canal within the root; and
   (b) the canal is filled with a second material different from the first material and representing a pulp material to be removed from the canal by a dental training procedure.

9. An insert as set forth in claim 6 wherein:
   (a) the gum material has an opening formed therethrough which is aligned with the socket of the jawbone.

10. A dental manikin for simulating a portion of a jaw of a human child having a tooth socket during dental root canal procedure training, the manikin comprising:
    (a) a tooth insert including:
       (1) a model of a primary tooth with a root;
       (2) a model of a bud of an adult tooth fixedly engaged with the root; and
       (3) an insert stem secured to the bud and mounted in the socket opposite the primary tooth so as to allow a simulated root canal procedure to be performed on the primary tooth without interference from the stem; and
    (b) a jaw portion including:
       (1) a bony portion with the tooth socket that is sized and shaped to removably receive the tooth insert; and
       (2) a gum portion in covering engagement with the bony portion.

11. The dental manikin according to claim 10, further comprising:
    (a) a tray sized and shaped to releasably secure the jaw portion.

12. The dental manikin according to claim 10, wherein:
    (a) the socket includes an upper portion and a lower portion;
    (b) the upper portion is sized and shaped to removably receive the insert primary molar, root structure and tooth bud;
    (c) the lower portion is sized and shaped to removably receive the insert stem, whereby the insert is secured in the jaw portion; and
    (d) the stem extends away from the bud in the opposite direction with respect to a primary tooth.

13. The dental manikin according to claim 12, wherein:
    (a) the socket upper portion includes an inner surface that is not engaged by the insert primary molar or root structure.

14. The dental manikin according to claim 10, wherein:
    (a) the tooth insert is a first tooth insert; and
    (b) the manikin includes an additional tooth insert, the additional tooth insert being interchangeable with the first tooth insert.

15. The dental manikin according to claim 14, wherein the tooth insert is a first tooth insert of a first size, and the additional tooth insert includes:
    (a) a primary molar that is of a second size which is different from the first size.

* * * * *